(12) United States Patent
Lu

(10) Patent No.: US 9,019,175 B2
(45) Date of Patent: Apr. 28, 2015

(54) OPTICAL DEVICE FOR VIRTUAL IMAGE DISPLAY WITH UNEQUAL FOCAL LENGTH AND HIGH MAGNIFICATION

(75) Inventor: Hsin-Tseng Lu, Nanjing (CN)

(73) Assignee: Watchman Tech. Co., Limited, Nanjing (CN)

( * ) Notice: Subject to any disclaimer, the term of this patent is extended or adjusted under 35 U.S.C. 154(b) by 28 days.

(21) Appl. No.: 14/123,772

(22) PCT Filed: Jun. 15, 2012

(86) PCT No.: PCT/CN2012/076965
§ 371 (c)(1),
(2), (4) Date: Dec. 4, 2013

(87) PCT Pub. No.: WO2012/174997
PCT Pub. Date: Dec. 27, 2012

(65) Prior Publication Data
US 2014/0125559 A1    May 8, 2014

(30) Foreign Application Priority Data
Jun. 24, 2011 (CN) .......................... 2011 1 0174468

(51) Int. Cl.
G09G 5/00 (2006.01)
G02B 27/01 (2006.01)
G02B 5/30 (2006.01)
G02B 1/11 (2006.01)

(52) U.S. Cl.
CPC .............. *G02B 27/0172* (2013.01); *G02B 5/30* (2013.01); *G02B 2027/0123* (2013.01); *G02B 2027/0118* (2013.01); *G02B 1/11* (2013.01); *G02B 2027/0127* (2013.01)

(58) Field of Classification Search
CPC .................................................. G02B 27/0172
See application file for complete search history.

(56) References Cited

U.S. PATENT DOCUMENTS

| 5,572,343 A | 11/1996 | Okamura et al. |
| 5,808,801 A * | 9/1998 | Nakayama et al. ............ 359/630 |
| 8,817,371 B1 * | 8/2014 | Boothroyd et al. ....... 359/485.02 |
| 2005/0180021 A1 * | 8/2005 | Travers ......................... 359/630 |

FOREIGN PATENT DOCUMENTS

| CN | 1146244 A | 3/1997 |
| CN | 101923222 A | 12/2010 |
| CN | 102253491 A | 11/2011 |
| CN | 202102176 U | 1/2012 |
| JP | 6105256 A | 4/1994 |
| JP | 11326818 A | 11/1999 |
| JP | 2000089157 A | 3/2000 |

* cited by examiner

*Primary Examiner* — Joseph Haley
*Assistant Examiner* — Ifedayo Iluyomade
(74) *Attorney, Agent, or Firm* — Treasure IP Group, LLC

(57) ABSTRACT

An optical device for virtual image display with unequal focal length and high magnification, comprising an image display, an optically transparent material and a mirror; the optically transparent material being disposed at an oblique angle between the image display and the mirror, and, on the optically transparent material, the side opposite the image display being coated with a reverse anti-reflective film, the other side being coated with a polarizing film or successively with a polarizing film and a forward anti-reflective film; and the included angle between the mirror and the optically transparent material together with the deposition angle M of the reverse anti-reflective film being 90°. The present invention is an optical device structural design with a virtual image optical design including a birefringence function, providing a new design with innovative and improved optics. When magnifying a spatial and virtual image to an even greater extent, the image is larger and clearer, and the planarity of the image is greater, there is no distortion, and user requirements for a head mounted display in the HMD product market can be met.

6 Claims, 3 Drawing Sheets

OPTICAL DEVICE FOR VIRTUAL IMAGE DISPLAY WITH UNEQUAL FOCAL LENGTH AND HIGH MAGNIFICATION

CROSS REFERENCE TO RELATED APPLICATION

This application is a National Phase application of, and claims priority to, PCT Application No. PCT/CN2012/076965, filed on Jun. 15, 2012, entitled "OPTICAL DEVICE FOR VIRTUAL IMAGE DISPLAY WITH UNEQUAL FOCAL LENGTH AND HIGH MAGNIFICATION", which claimed priority to Chinese Application No. 201110174468.9, filed on Jun. 24, 2011. Both the PCT Application and Chinese Application are incorporated herein by reference in their entireties.

TECHNICAL FIELD

This invention relates to a displayer, especially a virtual image displayer for dual-refraction imaging by the application of filming, and particularly it introduces a short focus length, high magnification, clear and flat virtual image displayer.

BACKGROUND OF THE INVENTION

Current virtual image displayers, such as the traditional HMD (head mounted displayer), project by optic reflection and refraction, e.g. the semi-reflection and refraction combined optic virtual image displayer introduced in Patent 200710176478.X. The virtual image is formed on an image forming piece after split on a polarizing sheet; at this time, the image forming focus length (distance from the polarizing sheet to the image forming piece) is long; the image on the image forming piece is formed by two overlapped semi-real and semi-virtual images on the visual focus length (distance from eyes to the polarizing sheet), the definition is poor; the image on the image forming piece will be gradually deformed with magnifying, as it is a basic principle of geometrical optics. And meanwhile by the setting of image forming piece, the visual focus length axis of the virtual image displayer is long, and the displayer appearance and dimensions are influenced. When a displayer with projecting system is being designed according to the geometrical optics, multi-layer magnifying is the usual way to solve the deformation of projected image, the image deformation is minimized by magnifying and regulating the scattering angle in each layer, the light path axis of such a displayer is prolonged, and a combination of many lens are used, and the dimensions are highly enlarged.

SUMMARY OF THE INVENTION

This invention intends to solve the defects in existing virtual image displayers including long image forming focus length, poor definition, serious deformation, long visual focus length axis and large appearance dimensions, and introduce a virtual image displayer with simple structure, short visual focus length axis, large image size, high flatness and high definition.

Technical Plan of this Invention

It relates to an unequal focus length and high magnification virtual image displayer consisting of image displayer, optically transparent material and reflector; the optically transparent material is obliquely set between the image displayer and reflector, the optically transparent material is coated with a backward anti-reflecting film at the side to the image displayer, and with a polarizing film or polarizing film and forward anti-reflecting film at the other side, and the sum of the angle between the reflector and optically transparent material and the coating angle of the backward anti-reflecting film is 90°.

The image displayer, optically transparent material and reflector are set coaxially.

The optically transparent material in this invention is at the coaxial line of visual angle.

The optically transparent material in this invention is made of high temperature resistant glass.

The angle between the concave mirror and the optically transparent material in this invention is 45°, and the coating angle of backward anti-reflecting film is 45°.

The reflector in this invention is a concave magnifying mirror or concave magnifying mirror group.

Beneficial Effect of this Invention

This invention is an innovative and improved novel optic design based on the dual-refraction virtual image displayer. By the novel principle of virtual image optic application, the virtual image can be enlarged and more clearly displayed by a higher magnification and higher image flatness without deformation, the visual axis (focus) distance of the image can be further shortened to satisfy the demand for HMD products. The optic design of this invention can eliminate the image deformation arising from magnifying, decrease the definition loss, and overcome the problem that the product appearance is improved by the large visual axial distance.

In this invention, the optically transparent material is orderly coated with polarizing film and backward anti-reflecting film at the side to the back of image displayer; the films are used to eliminate the light interference (e.g. halation and overlap arising from light scatter) on the projecting light path, protect the image definition at the light source, enhance the virtual image in the space, and project a high definition image closer to the real image by the dark room displaying effect.

The virtual image displayer in this invention provides a high magnification for image forming, and enhances 10~15% magnified visual effect by the shortened image forming focus distance.

This invention surpasses the restriction of geometrical optics, and can be used in the design, application and development of more projecting optic products.

DETAIL DESCRIPTION OF THE INVENTIONS

This invention is further explained as follows by the help of attached drawings and a practical example.

Figure 1:
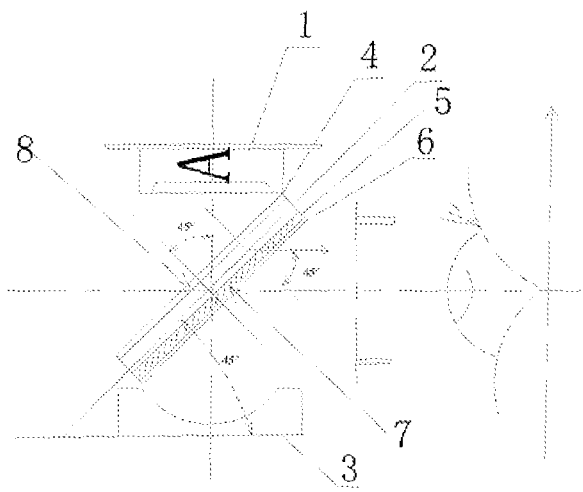
FIG. 1 is the structural schematic drawing of this invention.
Figure 2:
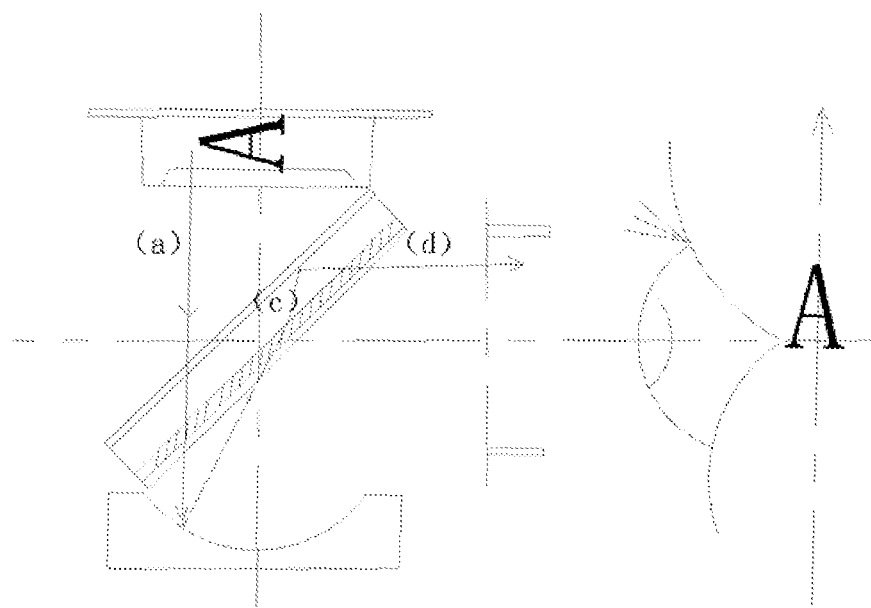
FIG. 2 is the schematic drawing for the main light path of this invention.
Figure 3:
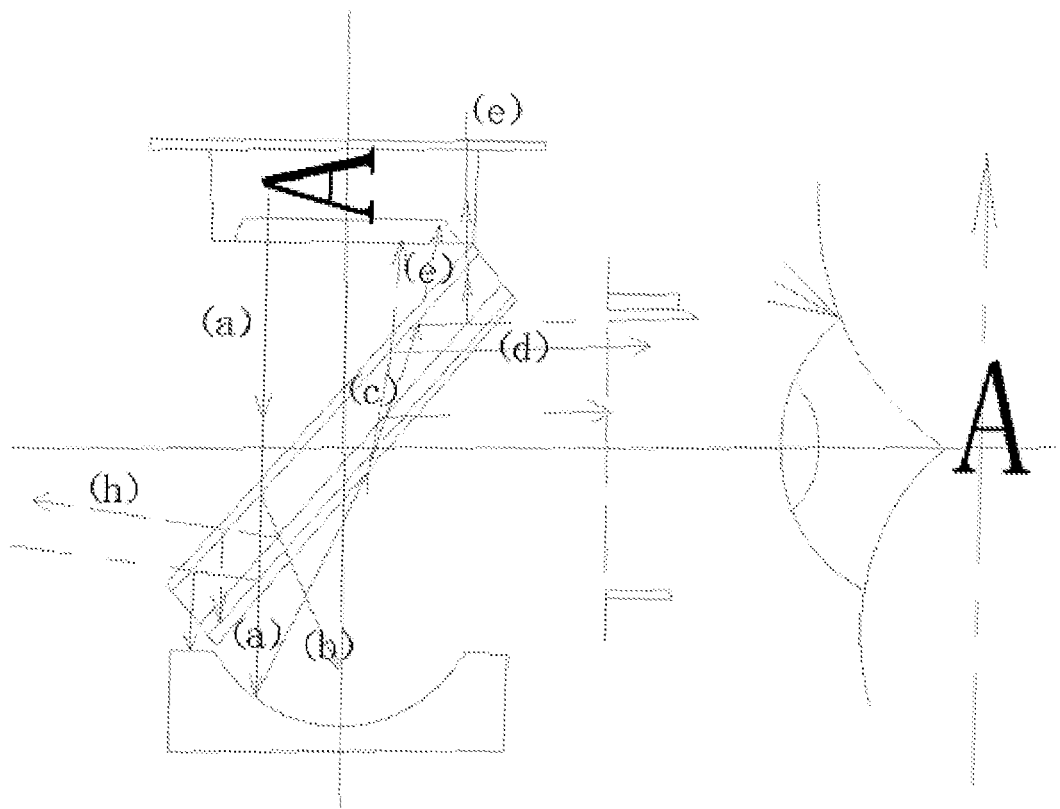
FIG. 3 is the schematic drawing for the light path of this invention.
Figure 4:
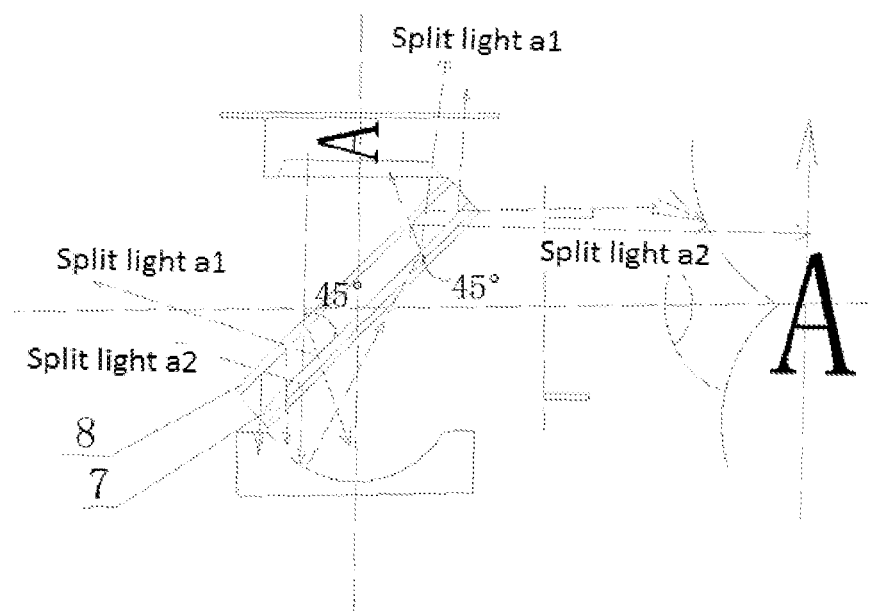
FIG. 4 is the system parameter diagram of the optic displayer of this invention.

As shown in FIG. 1-3, this invention relates to a virtual image displayer consisting of image displayer, optically transparent material and reflector; the optically transparent material is obliquely set between the image displayer and reflector, the optically transparent material is coated with a backward anti-reflecting film at the side to the image displayer ($1^{st}$ plane of the below mentioned glass piece), and with a polarizing film or polarizing film and forward anti-reflecting film at the other side ($2^{nd}$ plane of the below mentioned glass piece), and the sum of the angle between the reflector and optically transparent material and the coating angle of the backward anti-reflecting film is 90°.

Where, the image displayer is used to display the real image and project the image light;

the concave mirror is used to reflect the light projected by the image displayer via the polarizing piece.

The backward anti-reflecting film is coated by: when the anti-reflecting film is being coated to the optically transparent material by an electronic coating machine, the positive and negative charges on the electrode polarizing chambers of coating gun are reversed for backward coating, and thus a backward anti-reflecting film is formed on the optically transparent material surface.

The glass coated with polarizing film is the polarizing glass: as shown in FIG. 1, when the glass is coated with backward anti-reflecting film at one side and orderly with polarizing film and forward anti-reflecting film at the other side: the backward anti-reflecting film on the polarizing piece is semi-transparent and semi-reflective, the side towards the image displayer is the forward action surface, i.e. the transparent surface; the side towards the polarizing piece is the backward action surface, i.e. the reflective surface; the forward anti-reflecting film on the polarizing piece is semi-transparent and semi-reflective, the side towards the concave mirror is the forward action surface, i.e. the reflective surface; the side towards the polarizing film is the backward action surface, i.e. the penetrative surface; light projected from the image displayer penetrates the polarizing piece to the concave mirror, and light reflected from the concave mirror is further reflected by the polarizing piece.

Glass piece: as shown in FIG. 1, the glass is coated with backward anti-reflective film at one side and order with polarizing film and forward anti-reflective film at the other side: as shown in FIG. 2, light (a) from the image displayer penetrates the first and second planes of the glass piece to the concave mirror by which the light is further reflected to the first plane of the glass piece, and the light is split on the forward reflective film, the main split light (c) is refracted to the second plane of the glass, and the light (d) reflected on the backward anti-reflective film penetrates the forward anti-reflective film, and forms an image in the retina of the viewer.

Figure 5:
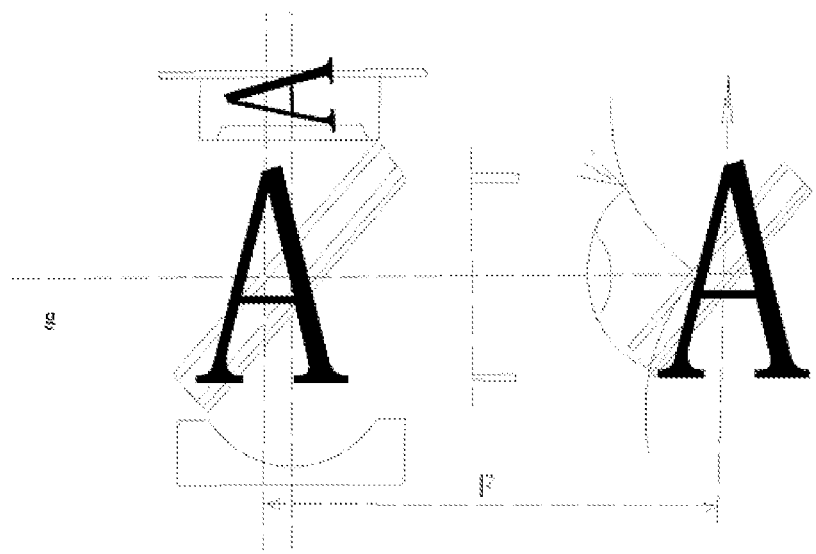
FIG. 5 is the schematic drawing for the principle of virtual image formation in this invention.
In the drawings: 1—image displayer; 2—optically transparent material; 3—reflector; 4—backward anti-reflecting film; 5—polarizing film; 6—forward anti-reflecting film; 7—$1^{st}$ plane; 8—$2^{nd}$ plane.

In FIG. 3, (a) transparent light; (b) refracted light (main split transparent light of (a)); (c) main split light: (e) the other split light (transparent); (d) reflected light of (e); (h) the other split light of split light (a);

In FIG. 5, F is the visual axis base (focus length) of axis g.

EXAMPLES

A dual-refraction virtual image optic displayer is optically improved based on original elements as follows:

1. In FIG. 1, the second plane of glass piece is electronically coated by a polarizing film with functional angle design so that 50% of the light is transparent and the other 50% is reflective. Light is uniformly split into two real (virtual) split images, the back side is further coated by a forward anti-reflective film to enhance the light penetration, improve the definition, and reduce the influence of light interference and halation arising from the scattering of external light.

2. The first plane of the glass piece (i.e. the side of the optically transparent material to the image displayer) is backwards and electronically coated (by the method for backward reflective film coating to remove the light interference in optic image formation introduced in Patent 201110069118.6) with the backward anti-reflective film to make the anti-reflective film of the backward action side generate a backward effect (a. used as the image forming piece; b. eliminate the light scatter and ghost in the glass thickness, reduce the light interference, and minimize the distortion influencing the definition).

3. The original image forming piece on the polarizing visual axis is removed; the function of image forming piece is transferred to the second plane of the glass piece, i.e. the plane coated with backward anti-reflective film to shorten the visual focus length and enlarge the visual effect.

4. An extra lens can be equipped to the eyeball window and glasses window to enhance the visual focus length of near-sightedness and presbyopia, and also glasses for nearsightedness and presbyopia patients.

The improved optic structure, assembly, novel optical application principle and mechanism, and the optical effect are explained as follows:

Mechanism for the improvement of above items 1, 2 and 3:

The improvement of the 3 items is to transfer the function of image forming piece onto the second plane, i.e. the plane with backward anti-reflective film, by which, the image forming focus length is shortened, light source image is generated by the anti-reflective backward film, the light is projected to the first plane, i.e. the plane between the polarizing film and forward anti-reflective film via 45° polarizing, and then penetrates to the concave magnifying refractor. After magnified by the arc refraction, it is projected to the first plane via a 45° polarizing angle, two refracted split images are generated and projected to the anti-reflective plane of the second plane, one split image directly penetrates the second plane via a 90° angle, and the other split image is projected to the second plane beyond 90°, because of the forward action of anti-reflective film, the light beams refracted beyond 90° turn back and penetrate the first plane, and an image is formed at the visual axis on the retina, the focus of the retina focus length is at the polarizing film of the first plane, and forms the focus of fixed focus length for image forming, but the light source image is not at the retina virtual image because of prolonged and extended via multiple refraction by the glass thickness (the virtual image will not influence the zooming action). The light source image is transferred to the second plane of the polarizing sheet (backward anti-reflective film), so the original polarizing route is highly shortened, the visual distance of the image seen by eyes is shortened, and the image seen is enlarged (larger than the original magnification). The above is the mechanism of image enlarging.

After the first plane of the polarizing glass is coated with a polarizing film, the forward anti-reflective film is further coated, and the backward anti-reflective film is coated to the second plane of the glass, by the combined action, normal light scatter (e.g. exposure) generated by multiple refraction (reflection) on the light path of the light source image is reduced in the visual feeling of eyeballs, and double images (ghost) generated in the penetrating interface (light interference is the main factor for image definition) will be removed by the backward anti-reflective film. The forward light penetration on the visual polarizing axis is enhanced, the definition decreasing arising from interference of halation is controlled, the displayer internal dark room effect is better, and a clearer visual feeling can be obtained by eyeballs. The above is the mechanism of definition enhancing.

The mechanism of this invention is the imaging mechanism of human eyeballs (virtual visual organ function), as eyes are the most delicate scanning and sensing organ, they can identify the space levels, but cannot zoom in multiple focuses (there is always only one focus) by the eyeball crystalline lens.

In this invention, the imaging focus length in the original equal focus length is shortened, i.e. the imaging piece in item 3 is removed, and the backward anti-reflective film on the second plane of the glass piece in item 2 is used as the imaging plane. The projecting image focus length is shortened by the backward action of anti-reflective film, the corresponding visual focus length on the visual polarizing axis is also highly shortened to the glass piece, and by the delicate layer sensing and single focus zooming of eyeballs, the highly penetrative second plane is used as the imaging plane of the visual focus length on the polarizing axis, i.e. the fixed focus on the retina. The virtual image formed via refraction by the second plane of the glass piece is formed on the polarizing axis of crystalline lens because of the layer space virtual visual function of eyeballs, so the retina imaging focus of human eyeballs in the dark room effect of the displayer is fixed on the second plane of the polarizing glass. A changing virtual image will be formed and sensed by the eyeballs without influencing the focus change of retina. This is the mechanism that eyeballs will not zoom frequently when seeing a virtual image and eyes will feel tired because of the frequently zooming of focus on the retina. The background image can be seen because of the highly penetrative second plane, and thus it is the mechanism of eyeball virtual vision optic effect for a space virtual image.

The imaging focus is shortened, so the radiating light path of magnified project is shortened, the zooming focus for imaging is not at the original polarizing axis, so there will be no distortion on the imaging plane, the light source image is also shortened with this imaging focus length, the focus will be refracted by the concave mirror to the back of the second plane, so the first focus of refracted image is at front of the concave mirror, the image is bottom up by refraction and is between the focuses of imaging focus length, the virtual image formed on the second plane of the glass piece, and the image is further magnified in eye feeling because of the shortened focus length on the polarizing axis. This is the optic mechanism why the image is not deformed by a higher magnification.

Any part related to this invention but not mentioned in this specification is similar with the existing technique or can be realized by the existing technique.

What is claimed is:

1. An image displayer, having unequal focus length and high magnification virtual, consisting essentially of
    an image displayer, an optically transparent material and a reflector; wherein
    the optically transparent material is obliquely set between the image displayer and reflector,
    the optically transparent material is coated with a backward anti-reflecting film at the side to the image displayer, and with a polarizing film or polarizing film and forward anti-reflecting film at the other side, and the sum of the angle between the reflector and optically transparent material and the coating angle of the backward anti-reflecting film is 90°.

2. The image displayer of claim 1, characterized in that the image displayer, optically transparent material and reflector are set coaxially.

3. The image displayer of claim 1, characterized in that the optically transparent material in this invention is at the coaxial line of visual angle.

4. The image displayer of claim 1, characterized in that the optically transparent material in this invention is made of high temperature resistant glass.

5. The image displayer of claim 1, characterized in that the angle between the concave mirror and the optically transparent material in this invention is 45°, and the coating angle of backward anti-reflecting film is 45°.

6. The image displayer of claim 1, characterized in that the reflector in this invention is a concave magnifying mirror or concave magnifying mirror group.

* * * * *